US008887127B2

(12) United States Patent
Lee et al.

(10) Patent No.: US 8,887,127 B2
(45) Date of Patent: Nov. 11, 2014

(54) WEB BROWSING APPARATUS AND METHOD THROUGH STORING AND OPTIMIZING JAVASCRIPT® CODE

(75) Inventors: Joo-Hwan Lee, Seoul (KR); Hongjune Kim, Seoul (KR); Gangwon Jo, Seoul (KR); Jeongho Nah, Seoul (KR); Honggyu Kim, Gunpo-si (KR); Yong-Jun Lee, Seoul (KR); Jaejin Lee, Seoul (KR); Seung-Mo Cho, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 374 days.

(21) Appl. No.: 13/302,268

(22) Filed: Nov. 22, 2011

(65) Prior Publication Data

US 2012/0185822 A1 Jul. 19, 2012

(30) Foreign Application Priority Data

Jan. 13, 2011 (KR) .................. 10-2011-0003707

(51) Int. Cl.
*G06F 9/45* (2006.01)
*G06F 9/455* (2006.01)

(52) U.S. Cl.
CPC .......... *G06F 8/4441* (2013.01); *G06F 9/45529* (2013.01)

USPC .......................................... 717/106

(58) Field of Classification Search
USPC .......................................... 717/106
See application file for complete search history.

(56) References Cited

U.S. PATENT DOCUMENTS

| | | | | |
|---|---|---|---|---|
| 2009/0265618 A1* | 10/2009 | Wang et al. | .................. | 715/250 |
| 2010/0153911 A1* | 6/2010 | Porras et al. | .................. | 717/106 |
| 2012/0030661 A1* | 2/2012 | Porras et al. | .................. | 717/153 |
| 2012/0066586 A1* | 3/2012 | Shemesh | ...................... | 715/235 |
| 2012/0124462 A1* | 5/2012 | Bannoura et al. | ............. | 715/234 |
| 2013/0086157 A1* | 4/2013 | Scoda | ............................ | 709/203 |
| 2013/0311879 A1* | 11/2013 | Wason | ............................ | 715/257 |
| 2014/0123103 A1* | 5/2014 | Ellen et al. | .................. | 717/106 |

* cited by examiner

*Primary Examiner* — John Chavis
(74) *Attorney, Agent, or Firm* — NSIP Law (57) ABSTRACT

A web browsing method and apparatus for enhancing a user's convenience in web browsing is provided in a system that uses a multi-core processor. The web browsing method and apparatus is applicable in a system, such as a smart phone that has a low computing power or that has a storage device like a flash memory operating in a rapid manner. Optimized machine codes are stored in files and incremental optimization is achieved, so the JAVASCRIPT® program of the web application has a small compilation overhead and achieves fast execution.

19 Claims, 11 Drawing Sheets

WEB BROWSING APPARATUS AND METHOD THROUGH STORING AND OPTIMIZING JAVASCRIPT® CODE

CROSS-REFERENCE TO RELATED APPLICATION(S)

This application claims the benefit under 35 U.S.C. §119 (a) of Korean Patent Application No. 10-2011-0003707, filed on Jan. 13, 2011, in the Korean Intellectual Property Office, the entire disclosure of which is incorporated herein by reference for all purposes.

BACKGROUND

1. Field

The following description relates to a web browsing technology for a multi-core processor that is capable of improving the execution performance of JAVASCRIPT® code.

2. Description of the Related Art

Recently, Asynchronous JAVASCRIPT® and XML (AJAX) have emerged for implementing web applications that are comparable to desktop applications, such as GOOGLE® Docs or GOOGLE® Maps, and have been used for WEB 2.0. In a conventional web environment, JAVASCRIPT® has been used to perform only a simple code that accesses a Data Object Model (DOM) object. However, with the change of the internet environment, for example, following the arrival of AJAX, the execution performance of JAVASCRIPT® has been gaining importance for implementing a web browser.

Full web browsing is widely used not only in the desktop environment but also in the embedded environment, such as a mobile phone, an IPTV, and the like. Different from the desktop environment, the embedded environment typically does not provide sufficient hardware resources for a full browsing web browser. For this reason, high performance JAVASCRIPT® engine has garnered a large amount of interest.

While keeping with such a change, various types of high performance engines have been released. TraceMonkey built in MOZILLA® FIREFOX®, V8 built in GOOGLE® Chrome, and SquirrelFish Extreme WebKit are some of the various engines. These engines use the Just-In-Time (JIT) compile technique, in which a JIT compiler compiles source code into machine code in real time. The JIT compile technique may improve the execution performance of an application written in JAVASCRIPT®.

However, such JAVASCRIPT® engines have limitations in achieving the high performance. For example, because the JIT compiler compiles the source code during execution of the application, the compilation time is not separated from the execution time. Therefore, there is a need for a compiling technique capable of reducing the compilation time as much as possible.

In order to satisfy the requirement of a compiling operation and to perform the compiling operation in as short of amount of time as possible, the JIT compiler does not perform optimization that is performed in a general compiler. This omission results in the generation of inefficient machine codes. In addition, after a machine code generated in the JAVASCRIPT® engine is released from a main memory, if the corresponding machine code is desired, the JAVASCRIPT® engine needs to perform compilation again causing an increase overhead.

In addition, the language characteristic of the JAVASCRIPT® has become a limiting factor to the high performance of the JAVASCRIPT® engine. JAVASCRIPT® is an object oriented language and tends to have short functions (procedures).

In addition, because JAVASCRIPT® is a dynamic typed language, a simple operation, such as an access to a property of an object, is achieved through a function invocation. The property may be dynamically added to an object or deleted from an object in JAVASCRIPT®.

Before the execution of the JAVASCRIPT® program, the location of a predetermined property of an object is unknown. A simple operation such as an access to a property of an object may be achieved through a stub code that is dynamically generated during execution. For this reason, the function invocation may occur very frequently in a JAVASCRIPT® program.

Before the actual execution of the JAVASCRIPT® program, the engine does not know which function is to be invoked in a call site. As a result, the program engine takes a lot of time to perform optimization for the frequent function invocations.

Due to these characteristics of JAVASCRIPT®, it is difficult for a JAVASCRIPT® engine to apply a typical compiler optimization method, such as inlining and inter-procedural analysis, to the frequent function invocations in a JAVASCRIPT® program. Accordingly, the machine code generated in the JAVASCRIPT® engine is less effective than the machine code that is obtained by compiling a code that is written in a static type language, such as C.

In addition, the use of multi-core processors has spread not only in the desktop environment but also in the embedded environment, but the conventional JAVASCRIPT® engine does not effectively use the multi-core processors in a system. For example, the JAVASCRIPT® program does not support a multithread operation. Accordingly, there are spare cores that are not being used in a system.

SUMMARY

In one general aspect, there is provided a web browsing method for storing and optimizing a JAVASCRIPT® code by use of a JAVASCRIPT® engine in a computing system, the web browsing method including checking the presence of information about a JAVASCRIPT® program of a website to visit, loading the information if the information about the JAVASCRIPT® program of the website to visit is present, and processing the JAVASCRIPT® of the website using the loaded information.

The information about the JAVASCRIPT® program may comprise machine codes, stub codes, and type information.

The web browsing method may further comprise storing codes that are generated through compiling of a JAVASCRIPT® program of a website which is visited for a first time and type information of the JAVASCRIPT® program as the information about the JAVASCRIPT® program.

The web browsing method may further comprise generating optimized codes by performing compiler optimization using the loaded information while the JAVASCRIPT® of the website is being processed.

The web browsing method may further comprise updating the information about the JAVASCRIPT® program by storing the optimized code into the information about the JAVASCRIPT® program of the website.

The storing may be performed when the information about the JAVASCRIPT® program of the website is released from a main memory while the JAVASCRIPT® of the website is being processed or when the visit to the website is finished.

If the JAVASCRIPT® engine ends operation while the optimized code is being generated, the machine code, the stub code, and the type information, which are included in the loaded information, may be maintained as the information about the JAVASCRIPT® program of the website.

The web browsing method may further comprise generating codes by compiling the JAVASCRIPT® program of the website, if the information about the JAVASCRIPT® program of the website to visit is not present.

The web browsing method may further comprise storing the generated codes as the information about the JAVASCRIPT® program of the website.

The web browsing method may further comprise generating optimized codes by performing compiler optimization using the generated codes while the JAVASCRIPT® of the website is being processed.

The computing system may be a multi-core system, and the processing of the JAVASCRIPT® of the website and the generating of the optimized code may be performed at different cores at the same time.

In another aspect, there is provided a web browsing apparatus for storing and optimizing a JAVASCRIPT® code using a JAVASCRIPT® engine in a computing system, the web browsing apparatus including a compiling unit configured to compile a JAVASCRIPT® program of a web site to visit, a storage unit configured to store a code that is generated through compiling of the JAVASCRIPT® program of the website and type information, an information checking unit configured to check whether the storage unit stores information about the JAVASCRIPT® program of the website, and an optimizing unit configured to generate an optimized code by performing compiler optimization using the code.

The computing system may be a multi-core system and the compiling unit and the optimizing unit may operate at different cores at the same time.

The storage unit may store a code comprising machine code, stub code, and type information.

The compiling unit may compile the JAVASCRIPT® program of the website if the website is a website visited for the first time or if the result of checking by the information checking unit is that the information about the JAVASCRIPT® program is not present.

The storage unit may update the optimized code into the code about the JAVASCRIPT® program of the website and may store the optimized code about the JAVASCRIPT® program of the website.

In another aspect, there is provided a multi-core processor for processing JAVASCRIPT® code of a website, the multi-core processor including a plurality of processing cores for processing the JAVASCRIPT® code, a compiling unit to compile the JAVASCRIPT® code using a first processing core, and an optimizing unit to optimize the JAVASCRIPT® code using a second processing core, wherein the compiling and the optimizing are simultaneously performed on the first processing core and the second processing core.

The multi-core processor may further comprise a storage for storing the optimized code.

The multi-core processor may further comprise a checking unit to check whether optimized code for the JAVASCRIPT® code has been stored in the storage, prior to compiling the JAVASCRIPT®, and if the optimized code has been stored in the storage unit, the compiler may compile the JAVASCRIPT® code using the optimized code that was previously stored in the storage.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

According to various examples described herein, various data such as machine codes, stub codes, and type information, which are generated at runtime, may be cached to a persistent memory, such as a disk, and incremental optimization may be achieved by use of a spare core, thereby reducing the compilation overhead and ensuring rapid execution of the JAVASCRIPT® program.

JAVASCRIPT® is a prototype based object oriented language that does not support classes, which is different from Java or $C^{++}$. A hidden class (map) is an internal data structure of a JAVASCRIPT® runtime that defines the structure of an object in a JAVASCRIPT®.

An inline cache technique may be used through the hidden class. The inline cache is a technique that may be used to speed up the runtime method binding by storing the results of a previous method lookup per call site by use of the hidden class. Type information is an example of inline cache information.

Figure 1:
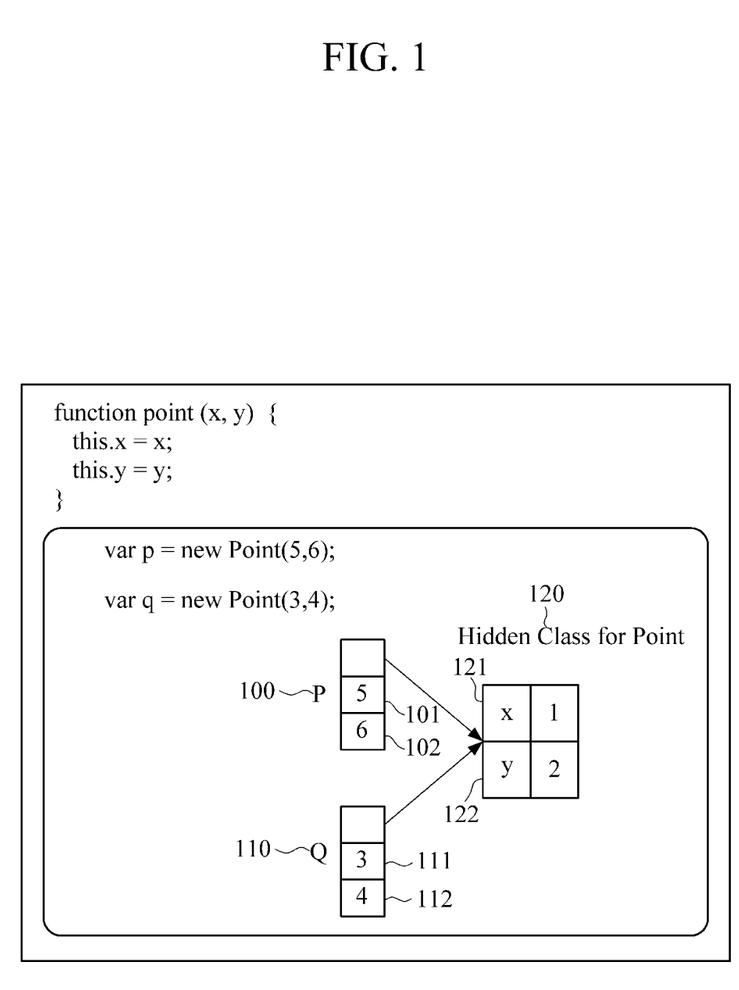
FIG. 1 is a diagram illustrating an example of a relationship between a JAVASCRIPT® object and a hidden class.

FIG. 1 illustrates an example of a relationship between a JAVASCRIPT® object and a hidden class.

Referring to FIG. 1, for a JAVASCRIPT® object P 100, an attribute that has a name of x is initialized into 5 (reference numeral 101) and an attribute that has a name of y is initialized into 6 (reference numeral 102) by use of a Point function.

For a JAVASCRIPT® object Q 110, an attribute 111 that has a name of x is initialized into 3 and an attribute 112 that has a name of y is initialized into 4. Each of the objects initialized by use of a Point function, such as the objects P 100 and Q 110, have a pointer referring to a hidden class (map) that describes its structure, in addition to its x and y attributes.

In this example, the hidden class referred by the object has information indicating that an attribute that has a name of x 121 and an attribute that h as a name of y 122 are stored in a first index and a second index, respectively, of the object.

Figure 2:
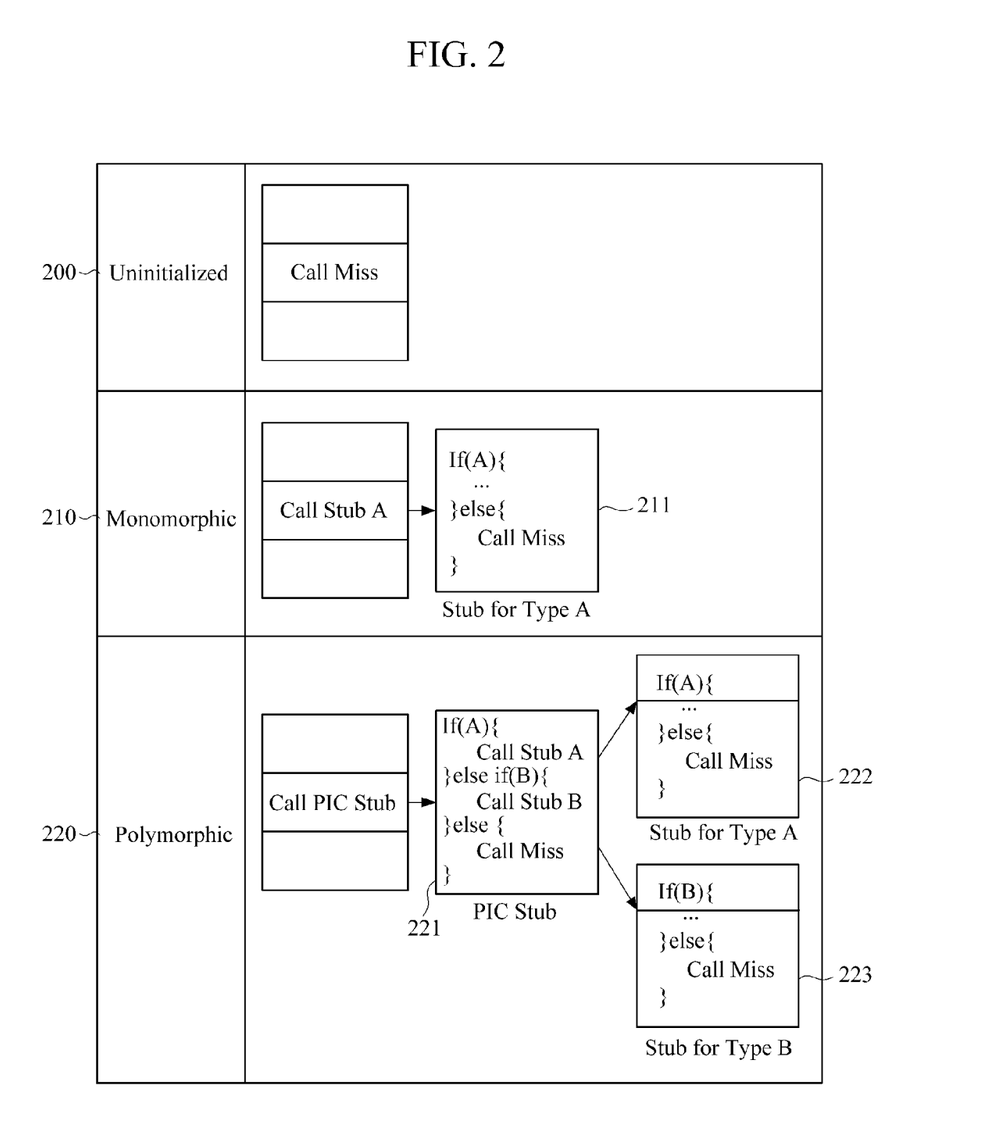
FIG. 2 is a diagram illustrating an example of inline cache technique.

FIG. 2 illustrates an example of inline cache technique.

On the assumption that the type (hidden class, map) of a receiver object at a call site is constantly maintained, a JAVASCRIPT® engine may use the inline cache technique to reduce overhead that is caused by a dynamic type lookup.

The JAVASCRIPT® engine may perform JIT compilation on a JAVASCRIPT® source in units of functions. Because the type of a receiver object at a call site is initially unknown, the JAVASCRIPT® engine may generate a code that allows a type miss to occur at the first visit of the corresponding call site. This state of the call site is referred to as uninitialized 200.

At the state of uninitialized, in this example an attribute of an A type receiver object is accessed during execution, and the state of the call site is changed into monomorphic 210. In this case, if an A type stub code is not present, the A type stub code 211 may be generated. For example, if the corresponding call site is visited again, the A type stub code 211 is called without additional method binding, so that the JAVASCRIPT® is more rapidly executed.

At the state of monomorphic 210, if an attribute of a B type object is accessed instead of the attribute of the A type object, a type miss occurs. In this example, the state of the call site is changed into polymorphic 220 and a polymorphic inline cache (PIC) stub 221 is generated. In this case, the call site points at the PIC stub 221. A routine for type checking is present in the PIC stub 221, and the PIC stub 221 points to code addresses 222 and 223 that are next to a type checking branch.

Upon a visit to a website, the JAVASCRIPT® engine performs JIT compilation on a JAVASCRIPT® program of a corresponding website and generates machine codes. As a result, the compilation time becomes an overhead. In addition, JAVASCRIPT® is a dynamically typed language and the type at a call site is not determined before execution of the call site. Accordingly, stub codes are generated during execution, and execution does not continue while the stub code is generated. Such a drawback causing an overhead is resolved through this example.

Figure 3A:
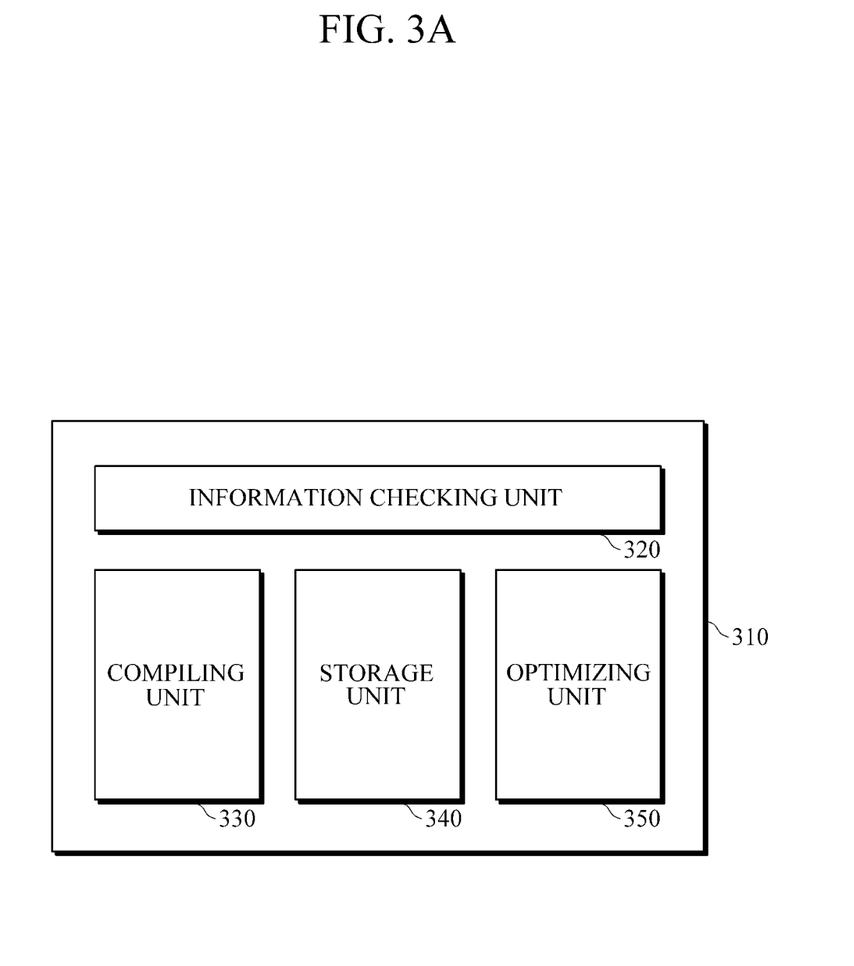
FIG. 3A is a diagram illustrating an example of a web browsing apparatus.
Figure 3B:
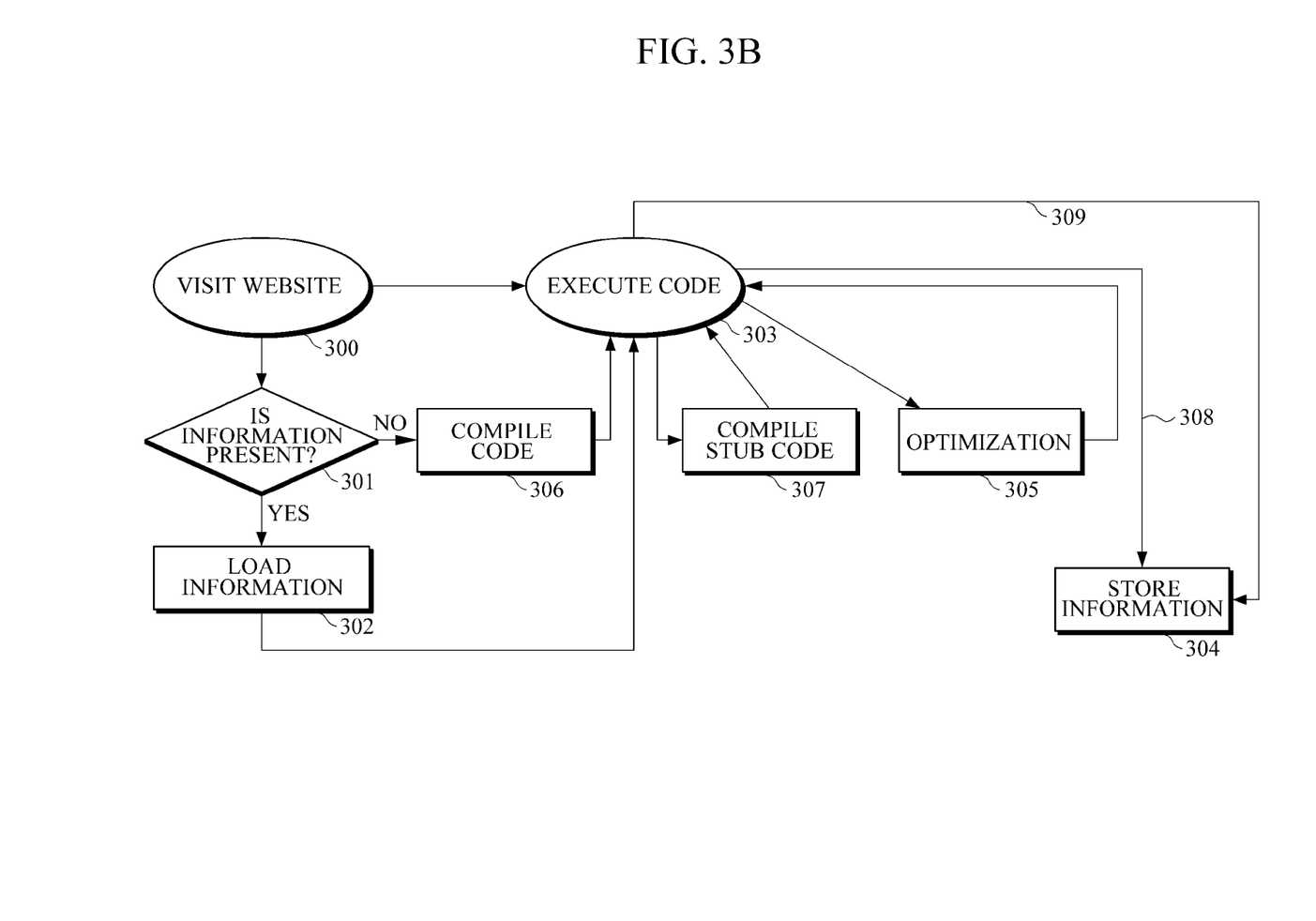
FIG. 3B is a flowchart illustrating an example of a web browsing method.
Figure 3C:
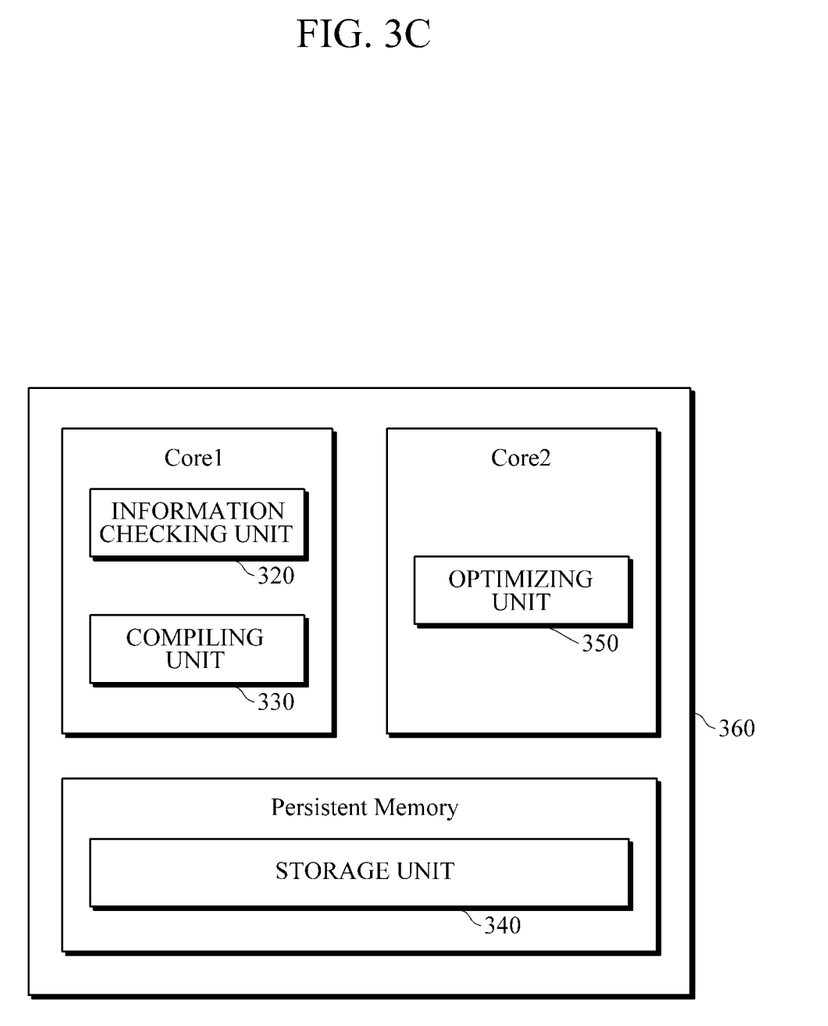
FIG. 3C is a diagram illustrating an example of a web browsing apparatus that is applied to a multi-core system.

FIGS. 3A to 3C illustrate examples of a web browsing apparatus and a web browsing method using the same. The web browsing apparatus may be or may be included in a terminal, such as a mobile terminal, a computer, a smart phone, a MP3 player, and the like.

FIG. 3A illustrates an example of a web browsing apparatus.

Referring to FIG. 3A, a web browsing apparatus 310 includes an information checking unit 320, a compiling unit 330, a storage unit 340, and an optimizing unit 350.

The compiling unit 330 may compile a JAVASCRIPT® program of a web site. The storage unit 340 may store codes that are generated as the JAVASCRIPT® program of the website is compiled, and type information about the JAVASCRIPT® program. The information checking unit 320 may check whether the storage unit 340 stores information about the JAVASCRIPT® program of the website. The optimizing unit 350 may generate more optimized code by performing compiler optimization using generated machine codes, stub codes, and type information.

In the case of a first visit to a website, or if a result of checking by the information checking unit 320 is that information about a JAVASCRIPT® program of the website is not present, the compiling unit 330 may compile the JAVASCRIPT® program of the website. The storage unit 340 may update the optimized code that is generated in the optimizing unit 350, into the code of the JAVASCRIPT® program of the website, and may store the updated optimized code.

FIG. 3B illustrates an example of a web browsing method.

Referring to FIG. 3B, in response to a website being visited (300), the information checking unit 320 checks the presence of a file which has information about the JAVASCRIPT® program of the website (301). In response to the file being present, codes and type information are loaded from the file and relocation is performed on the codes (302).

The caching (304) is performed when a code or a hidden class (map) that is generated during execution is released from a memory (308) or in response to a visit to the web site being finished (309). Optimization is performed on a function that is determined as a hot spot of the program, through a spare core (305). If the optimization is achieved before the JAVASCRIPT® program is finished, the optimized code and a hidden class (map) which is referred to by the optimized code are cached instead of caching the original code. Accordingly, when the optimized code is read from the file, the optimized code and the hidden class (map) may be read from the file and loaded and executed.

If the optimization fails to finish within the execution time of the program, the original machine code and stub codes used for optimization, type information for each call site, such as inline cache information, and a hidden class referred by the stub codes are cached and used for the optimization at the next visit to the corresponding website. In this example, the machine code and the stub codes stored in the file are not used directly and but used through relocation after loading (302).

If there is no file that has cached information about the JAVASCRIPT® program of a website (301), the JAVASCRIPT® engine performs JIT compilation on the JAVASCRIPT® program of the corresponding website (306). If a file does have cached information about the JAVASCRIPT® program of a website, the code loaded in operation 302 or the compiled code obtained in operation 306 are executed such that the website to visit is processed (303). In this example, while the code is being executed, stub codes are compiled (307) or optimization of the code is performed (305).

FIG. 3C illustrates an example of a web browsing apparatus 360 that is applied to a multi-core system.

Referring to FIG. 3C, the web browsing apparatus 360 operates in a computing system that has multiple cores and a persistent memory. For example, the persistent memory may be a memory such as a hard disk drive (HDD), a solid-state drive (SSD), and the like. The web browsing apparatus 360 may be applied to a multi-core system that has multi-cores in the computing system.

The information checking unit 320 and the compiling unit 330 are included in core 1, the optimizing unit 350 is included in core 2, and the storage unit 340 is included in the persistent memory in the multi-core system. Based on this configuration, the web browsing apparatus 360 may operate in the same manner as that of the web browsing apparatus 310 shown in FIG. 3A.

The compiling unit 330 may compile a JAVASCRIPT® program of a website. The storage unit 340 may store machine codes, stub codes, and type information that are generated as the JAVASCRIPT® of the website is compiled. The information checking unit 320 may check whether the storage unit 340 stores information about the JAVASCRIPT® program of the website. The optimizing unit 350 may generate optimized codes by performing compiler optimization using the generated machine codes, stub codes, and type information.

In the example of FIG. 3C, the information checking unit 320 and the compiling unit 330 operate in a core that is different from a core in which the optimizing unit 350 operates. Accordingly, the information checking unit 320, the compiling unit 330, and the optimizing unit 350 may operate at the same time or at different times, thereby improving a user's convenience in web browsing and enhancing the efficiency in web browsing.

Figure 4:
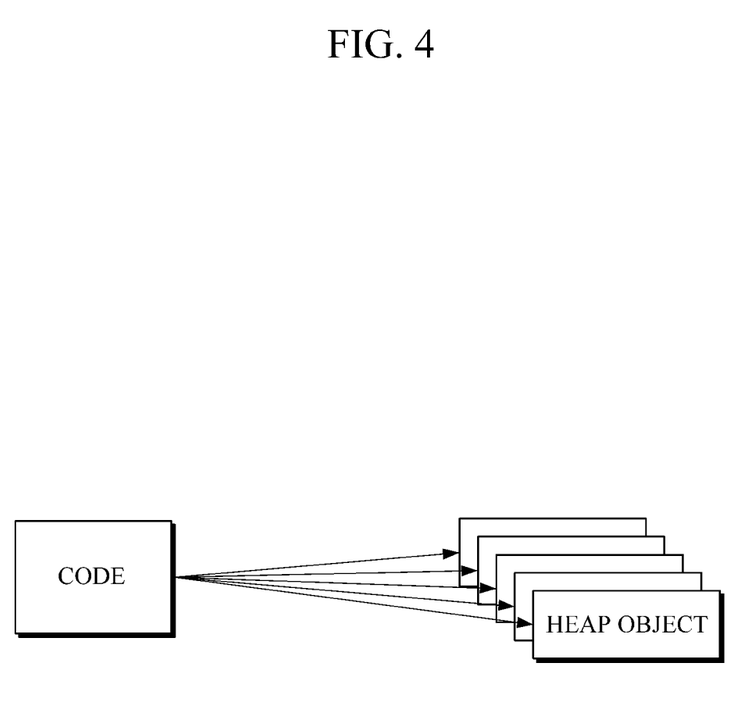
FIG. 4 is a diagram illustrating an example of a JAVASCRIPT® code that refers to a plurality of heap objects.

FIG. 4 illustrates an example of a JAVASCRIPT® code that refers to a plurality of heap objects.

In a JAVASCRIPT® engine, the reference to a heap object is represented by use of a memory address. The address value varies between a time a caching is achieved and a time a file is read for reuse. Accordingly, the JAVASCRIPT® engine may cache the code and a predetermined piece of information that is used to find a corresponding heap object, in a file, and may perform relocation on the information at loading.

Figure 5:
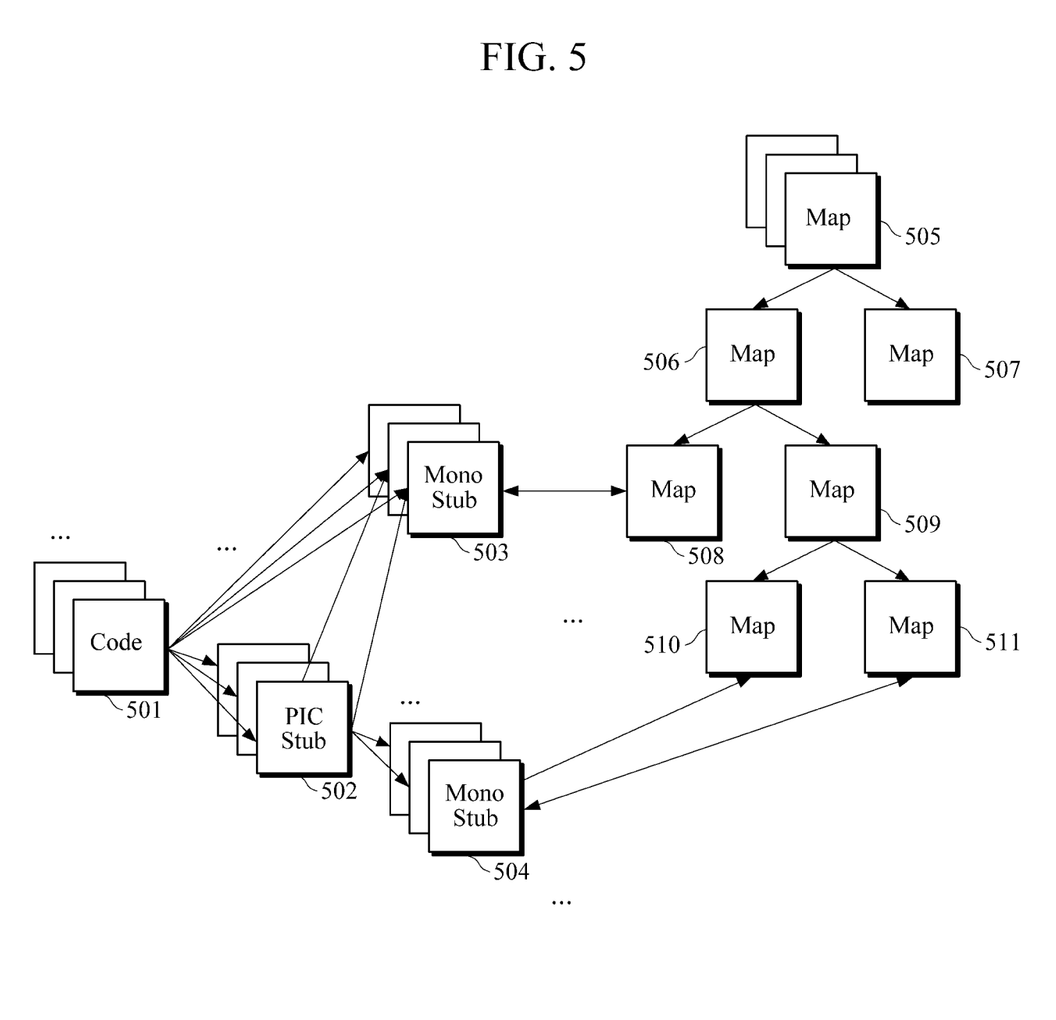
FIG. 5 is a diagram illustrating an example of a relationship among a JAVASCRIPT® code, a stub code, and a hidden class (map).

FIG. 5 illustrates an example of a relationship among a JAVASCRIPT® code, a stub code, and a hidden class (map). The JAVASCRIPT® code, the stub code, and the hidden class (map) may be dynamically generated as described with reference to FIG. 4.

In this example, machine code 501 refers to a plurality of Polymorphic (PIC) stub codes 502 and a plurality of monomorphic stub codes 503, and the PIC stub codes 502 refer to a plurality of monomorphic stub codes 503 and 504. The state of each call site is indicated by the referred stub code (inline cache).

Each of maps 505 to 511 represents a hidden class, that is, a structure of each JAVASCRIPT® object. Objects that have the same structure have the same hidden class in a JAVASCRIPT® program.

The maps 505 to 511 are dynamically generated during the execution of the JAVASCRIPT®. As shown in FIG. 5, the map 508 refers to the monomorphic stub code 503 and the map 511 refers to the monomorphic stub code 504. The type checking at a stub code may be achieved through comparison of an address of map.

If the optimization of the JAVASCRIPT® program is not achieved during the execution of JAVASCRIPT® program, the JAVASCRIPT® engine may store the inline cache information, stub code, and map, which are dynamically generated, along with the original machine code, in a file.

In this example, the JAVASCRIPT® engine learns type information about JAVASCRIPT® codes before execution, and achieves optimization including inlining, by use of the learned type information.

Figure 6:
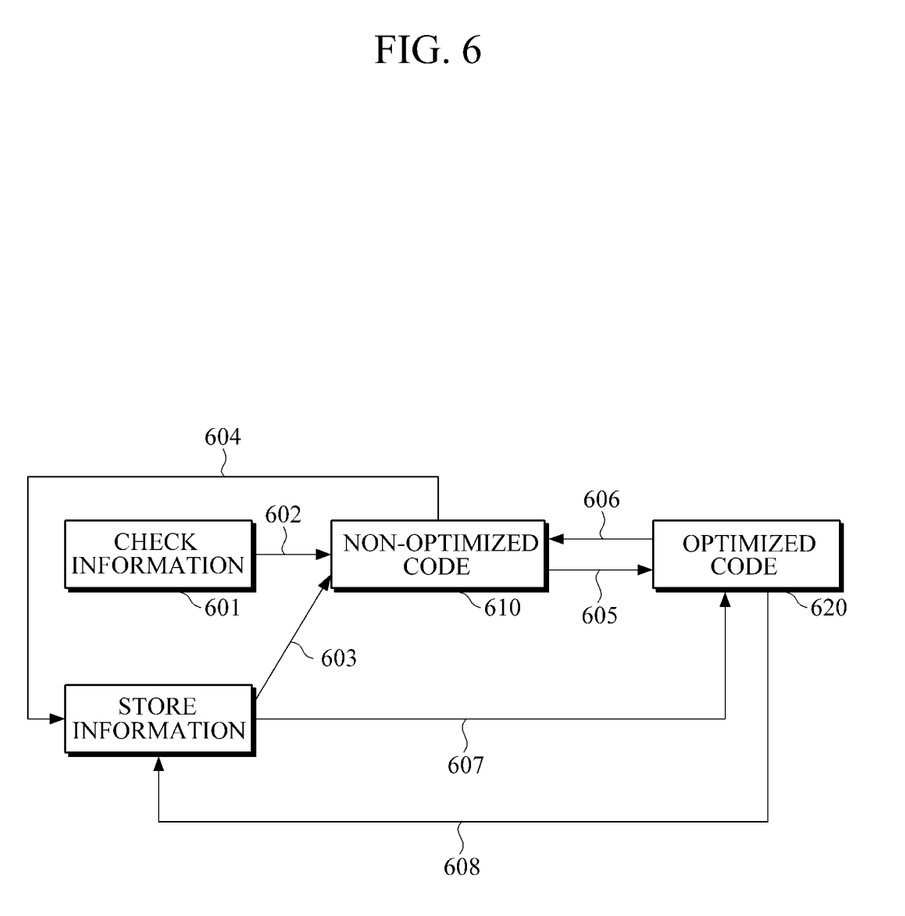
FIG. 6 is a diagram illustrating an example of a process of generating, optimizing and storing a JAVASCRIPT® code.

FIG. 6 illustrates an example of a process of generating, optimizing, and storing a JAVASCRIPT® code.

When a website is visited for the first time or a machine code corresponding to a source string is not stored in a file (601), the JAVASCRIPT® engine performs compilation, to generate a machine code that is not optimized (602).

If the machine code for the corresponding source is stored in a file, the machine code is read from the file to a memory without performing the above compilation, thereby reducing compilation overhead (603).

If the JAVASCRIPT® engine encounters a hot spot of a program during execution of a program (610), the JAVASCRIPT® engine performs optimization. In this example, a spare core that is not performing JAVASCRIPT® execution, generates an optimized code (605) through type feedback using type information that is generated at runtime or that has been previously stored (604) in a file at a previous visit to the website. The JAVASCRIPT® engine replaces a non-optimized machine code with the optimized code (606).

The optimization (620) may include performing inlining on codes and various kinds of complier optimizations on the inlined codes (607).

Figure 7A:
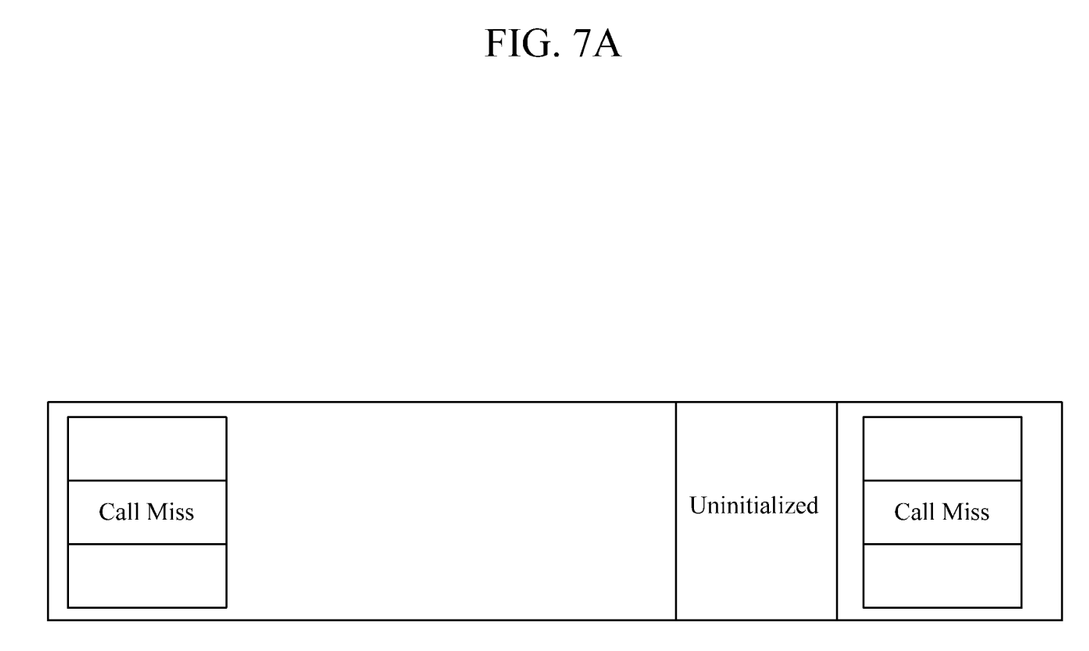
FIGS. 7A to 7C are diagrams illustrating different states of a JAVASCRIPT® code to which inlining is applied.
Figure 7B:
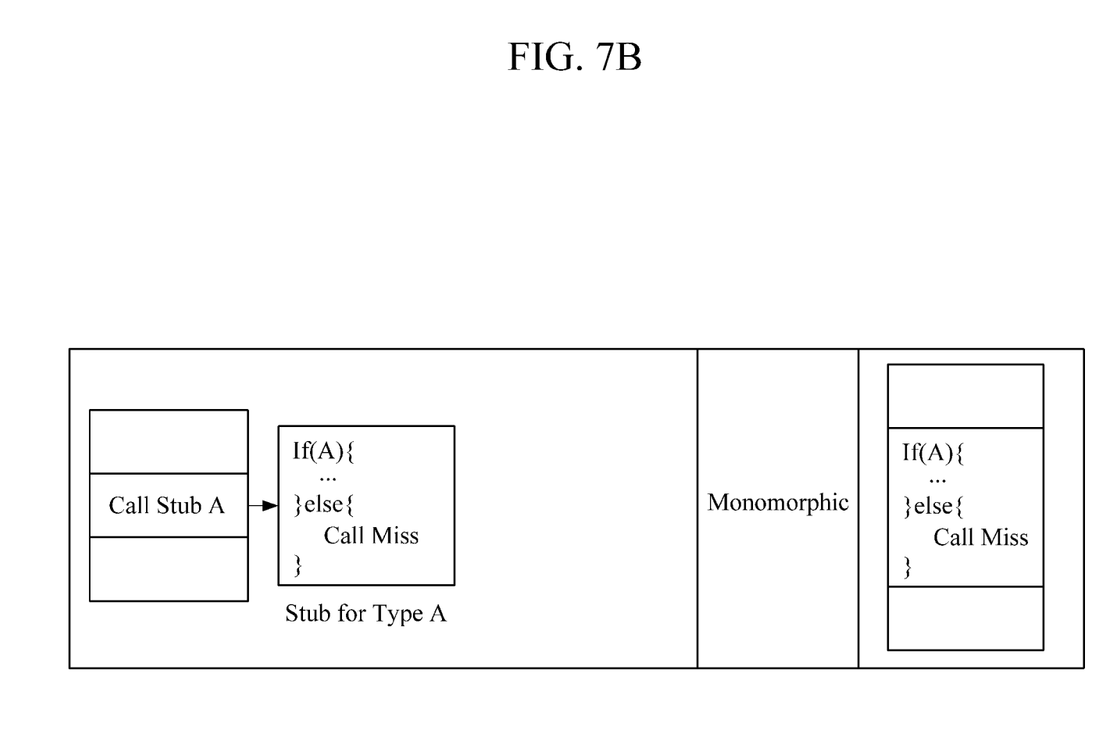
Figure 7C:
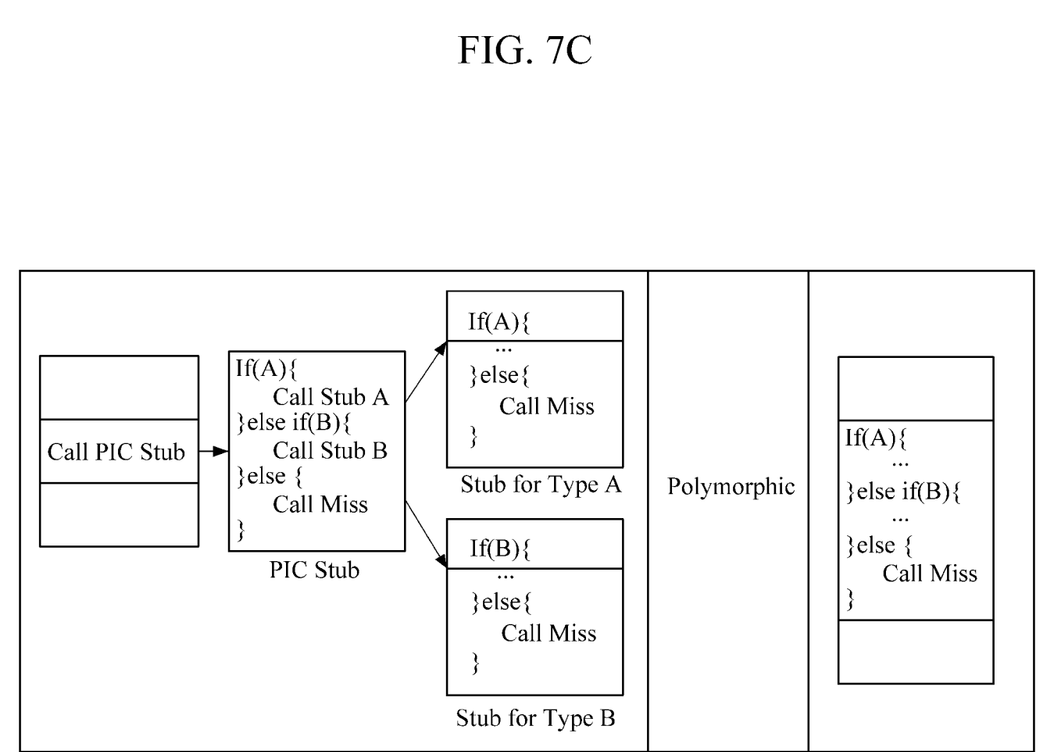

FIGS. 7A to 7C illustrate examples of different states of a JAVASCRIPT® code to which inlining is applied.

As shown in FIGS. 7A to 7C, the overhead caused by frequent calls and type checking may be reduced through inlining, and compiler optimization may be performed. Thereafter, if a visit to a website is finished, the generated optimized code and hidden classes may be stored in a persistent memory (608).

The JAVASCRIPT® engine is capable of improving performance by performing optimization at each execution without producing optimization overhead using a spare core. That is, the generating of optimized machine codes and the execution of the generated machine codes are performed at different cores in the multi-core system, thereby enhancing the JAVASCRIPT® performance.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A web browsing method for storing and optimizing a JAVASCRIPT® code by use of a JAVASCRIPT® engine in a computing system, the web browsing method executed by a web browsing apparatus and comprising:
   checking the presence of information about a JAVASCRIPT® program of a website to visit;
   loading the information if the information about the JAVASCRIPT® program of the website to visit is present; and
   processing the JAVASCRIPT® of the website using the loaded information.

2. The web browsing method of claim 1, wherein the information about the JAVASCRIPT® program comprises machine codes, stub codes, and type information.

3. The web browsing method of claim 1, further comprising storing codes that are generated through compiling of the JAVASCRIPT® program, when visiting the website for the first time, and type information of the JAVASCRIPT® program as the information about the JAVASCRIPT® program.

4. The web browsing method of claim 1, further comprising generating optimized codes by performing compiler optimization using the loaded information while the JAVASCRIPT® of the website is being processed.

5. The web browsing method of claim 4, further comprising updating the information about the JAVASCRIPT® program by storing the optimized code into the information about the JAVASCRIPT® program of the website.

6. The web browsing method of claim 3, wherein the storing is performed when the information about the JAVASCRIPT® program of the website is released from a main memory while the JAVASCRIPT® of the website is being processed or when the visit to the website is finished.

7. The web browsing method of claim 4, wherein if the JAVASCRIPT® engine ends operation while the optimized codes are being generated, machine code, stub code, and the type information, which are included in the loaded information, are maintained as the information about the JAVASCRIPT® program of the website.

8. The web browsing method of claim 1, further comprising generating codes by compiling the JAVASCRIPT® program of the website, if the information about the JAVASCRIPT® program of the website to visit is not present.

9. The web browsing method of claim 8, further comprising storing the generated codes as the information about the JAVASCRIPT® program of the website.

10. The web browsing method of claim 9, further comprising generating optimized codes by performing compiler optimization using the generated codes while the JAVASCRIPT® of the website is being processed.

11. The web browsing method of claim 4, wherein the computing system is a multi-core system, and the processing of the JAVASCRIPT® of the website and the generating of the optimized codes are performed at different cores at the same time.

12. A web browsing apparatus for storing and optimizing a JAVASCRIPT® code using a JAVASCRIPT® engine in a computing system, the web browsing apparatus comprising:
   a compiling unit configured to compile a JAVASCRIPT® program of a web site to visit;
   a storage unit configured to store a code that is generated through compiling of the JAVASCRIPT® program of the website and type information;
   an information checking unit configured to check whether the storage unit stores information about the JAVASCRIPT® program of the website; and
   an optimizing unit configured to generate an optimized code by performing compiler optimization using the code.

13. The web browsing apparatus of claim 12, wherein the computing system is a multi-core system and the compiling unit and the optimizing unit operate at different cores at the same time.

14. The web browsing apparatus of claim 12, wherein the stored code comprises machine code, stub code, and the type information.

15. The web browsing apparatus of claim 12, wherein the compiling unit compiles the JAVASCRIPT® program of the website if the website is a website visited for the first time or if the result of checking by the information checking unit is that the information about the JAVASCRIPT® program is not present.

16. The web browsing apparatus of claim 12, wherein the storage unit updates the optimized code into the code about the JAVASCRIPT® program of the website and stores the optimized code about the JAVASCRIPT® program of the website.

17. A multi-core processor for processing JAVASCRIPT® code of a website, the multi-core processor comprising:
   a plurality of processing cores for processing the JAVASCRIPT® code;
   a compiling unit to compile the JAVASCRIPT® code using a first processing core; and
   an optimizing unit to optimize the JAVASCRIPT® code using a second processing core,
   wherein the compiling and the optimizing are simultaneously performed on the first processing core and the second processing core.

18. The multi-core processor of claim 17, further comprising a storage for storing the optimized code.

19. The multi-core processor of claim 18, further comprising a checking unit to check whether optimized code for the JAVASCRIPT® code has been stored in the storage, prior to compiling the JAVASCRIPT®, and if the optimized code has been stored in the storage unit, the compiler compiles the JAVASCRIPT® code using the optimized code that was previously stored in the storage.

* * * * *